United States Patent [19]
Cederroth

[11] Patent Number: 5,393,032
[45] Date of Patent: Feb. 28, 1995

[54] NON-REUSABLE, PEEL OFF COVERED ICE TRAY

[75] Inventor: Sture C. Cederroth, Fairfield, Iowa

[73] Assignee: Arctic Icewater, Inc., Fairfield, Iowa

[21] Appl. No.: 977,507

[22] Filed: Nov. 16, 1992

Related U.S. Application Data

[63] Continuation-in-part of Ser. No. 930,185, Aug. 17, 1992, abandoned, which is a continuation of Ser. No. 778,286, Oct. 17, 1991, abandoned, which is a continuation of Ser. No. 458,572, Dec. 29, 1989, abandoned, which is a continuation of Ser. No. 188,278, Apr. 29, 1988, Pat. No. 4,899,976.

[51] Int. Cl.$^6$ .............................................. F25C 1/22
[52] U.S. Cl. .................................. 249/61; 206/484.2;
206/524.1; 206/524.6; 206/525; 206/532;
206/539; 249/121; 249/122; 249/127; 249/134;
156/344
[58] Field of Search ............... 206/484, 484.2, 524.1,
206/524.2, 524.6, 525, 531, 532, 539, 820;
249/52, 61, 121, 122, 127, 134, 135, 140;
426/515, 521, 392, 393, 515; 220/516, 525, 526;
156/344

[56] References Cited

U.S. PATENT DOCUMENTS

| | | | |
|---|---|---|---|
| 2,235,964 | 3/1941 | Meyer et al. | 107/19 |
| 2,537,915 | 1/1951 | Roop | 62/108.5 |
| 2,955,044 | 10/1960 | Tupper | 249/127 |
| 3,380,578 | 4/1968 | Sparks | 206/532 |
| 3,386,837 | 6/1968 | Arnot | 426/115 |
| 3,661,353 | 5/1972 | Newsteder | 249/103 |
| 3,689,458 | 9/1972 | Hellstrom | 206/532 |
| 3,759,379 | 9/1973 | Wrede | 206/524.2 |
| 3,783,089 | 1/1974 | Hurst et al. | 206/532 |
| 3,837,782 | 9/1974 | Meissner et al. | 425/347 |
| 4,011,949 | 3/1977 | Braber et al. | 206/532 |
| 4,023,768 | 5/1977 | Herrera-Casasus | 249/127 |
| 4,105,118 | 8/1978 | Williams, Jr. et al. | 206/524.2 |
| 4,287,171 | 9/1981 | Jordy et al. | 206/484.2 |
| 4,305,502 | 12/1981 | Gregory et al. | 206/532 |
| 4,807,787 | 2/1989 | Langmeier et al. | 222/529 |
| 4,913,307 | 4/1990 | Takata et al. | 220/276 |

FOREIGN PATENT DOCUMENTS

| | | |
|---|---|---|
| 149418 | 6/1986 | Denmark . |
| 1537903 | 7/1968 | France . |
| 2040845 | 1/1971 | France . |
| 2159549 | 5/1973 | France . |
| 2169491 | 8/1973 | France . |
| 2410427 | 9/1975 | Germany . |

Primary Examiner—Mark A. Osele
Attorney, Agent, or Firm—Ohlandt, Greeley & Ruggiero

[57] ABSTRACT

There is provided an ice tray that includes a body and a laminated cover that has a plastic coat for securing together the body and the cover. The body includes a plurality of individual cavities for receiving liquid therein. Each wall of each cavity has an upper edge that forms a lip. The cover is sealed along each lip of each cavity to provide a liquid tight seal for each cavity. The body and cover are each, preferably, formed of a single sheet of material. The body is made of pure polyvinyl chloride plastic, and the cover is made of a laminate of polyester and polyamide with adhesive therebetween and the plastic coat on the side of the polyester opposite the adhesive.

5 Claims, 3 Drawing Sheets

NON-REUSABLE, PEEL OFF COVERED ICE TRAY

RELATED APPLICATIONS

This application is a continuation-in-part of application Ser. No. 07/930,185, filed Aug. 17, 1992, now abandoned, which in turn is a continuation of application Ser. No. 07/778,286, filed Oct. 17, 1991, now abandoned, which in turn is a continuation of application Ser. No. 07/458,572, filed Dec. 29, 1989, now abandoned, which in turn is a continuation of application Ser. No. 07/188,278, filed Apr. 29, 1988, now U.S. Pat. No. 4,899,976, which issued on Feb. 13, 1990.

BACKGROUND OF THE INVENTION

1. Field of the Invention

The present invention relates generally to an enclosed ice tray. More particularly, it relates to a non-reusable, enclosed ice cube tray in which individual ice receptacles or cavities for forming ice cubes are filled with a desired liquid when the ice cavities are enclosed. Once the cover of a cavity is peeled away, it can not be resecured to the body of the cavity so that a user has a positive indication that the contents of the cavity has been exposed to the outside.

Significantly, the cover of each cavity is made so that it will support stacking of one ice tray on another during shipping and storage. In addition, the ice cube tray is made so that when a cover area over one cavity is peeled off the cover acts to prohibit the inadvertent ejection of an ice cube in another cavity. In the preferred embodiment, the cover areas are areas on a single cover sheet.

In the present environment, one is concerned about the contaminants found in water supplies. Many people desire to drink fluid from a filtered or controlled source, such as "pure" spring water. It is believed that many liquids, such as liquor, is enhanced by mixing that liquid only with "pure" spring water instead of tap water. Thus, the ice cubes used in such drinks should be made of "pure" spring water.

To assure a customer that the ice cubes will only be made of "pure" spring water, it is necessary that there be a way of assuring, from the time the liquid that forms the ice cubes leaves a production facility to the time it reaches the customer, that the less costly or undesired tap water will not be included.

Thus, there is a need to provide an ice cube tray that permits the manufacturer or producer to seal the tray with the desired liquid, such as "pure" spring water, at the time the manufacturer fills the tray so that the ice cubes formed therein cannot be contaminated, and to construct the tray so that once an ice cube is removed or the contents of a cavity tampered with the customer is immediately notified.

2. Description of The Prior Art

It is known in the art to provide an ice cube tray in which the receptacles for forming the ice cubes are enclosed. Specifically, there are known ice cube trays that include a cover or lid to enclose the ice forming receptacles. However, such covers can be removed so that a formed cube can be ejected and the receptacle can be refilled with liquid and the cover reattached to form a new ice cube. Some such trays include those shown in U.S. Pat. Nos. 4,432,529 to McMillian, which issued on Feb. 21, 1984; 3,414,229 to Norberg, which issued on Dec. 3, 1968; 3,374,982 to Sallade, which issued on Mar. 26, 1968; 3,019,617 to Malthaner, et al., which issued on Feb. 6, 1962; 2,804,755 to Ansel, which issued on Sep. 3, 1957; 2,769,316 to Candor, which issued on Nov. 6, 1956; 2,629,987 to Chase, which issued on Mar. 4, 1953; 2,613,512 to Gaugler, which issued on Oct. 14, 1952; 2,503,306 to Storer, which issued on Apr. 11, 1950; 2,069,195 to Chilton, which issued on Feb. 2, 1937; 2,011,849 to Chilton, which issued on Aug. 20, 1935; 2,001,289 to Klyce, Jr., which issued on Aug. 13, 1935; Re. 19,322 to Tanger; which issued on Sep. 18, 1934; 1,896,849 to Newman, which issued on Feb. 7, 1933; and the commercial ice tray product sold by Cooly International, Inc., and the commercial ice tray product called Kwik Kubes sold by Hyman Products Inc. of St. Louis, Mo.

Other trays include an upper portion for forming the individual ice cubes, a lower portion adapted to receive the formed ice cubes, and a divider to separate the upper portion from the lower portion of the tray. One such tray is shown in U.S. Pat. No. 3,135,101 to Nigro, which issued on Jun. 2, 1964.

Other enclosed structures or devices for forming individual ice cubes include a bag or other resilient structure separated into individual compartments. Some such devices are shown in U.S. Pat. Nos. Re. 31,890 to Vangedal-Nielsen, which issued on May 21, 1985; 3,306,567 to Frei, Sr., which issued on Feb. 28, 1967; 2,966,041 to Zearfoss, Jr., et al. which issued on Dec. 17, 1960; and U.S. Pat. No. 2,964,920 to Steabler, which issued on Dec. 20, 1960. The Vangedal-Nielsen patent permits the ice cube to form a circular shape instead of the conventional square shape cube. Other such ice trays having covers or lids permit the cubes to form a shape other than a square or rectangular shape include U.S. Pat. Nos. 4,417,716 to Penna, et al., which issued on Nov. 29, 1983 and 2,049,902 to Fischer, which issued on Aug. 4, 1936, and a commercial product sold by Hello Productions, Inc. of Elk Grove Village Illinois under the mark Ice Shapers.

One prior art patent, U.S. Pat. No. 2,955,044, which issued on Oct. 4, 1960 to E. S. Tupper, is directed to an ice tray that has a peel off cover that can be reused or discarded after its first use. The body of this tray is formed of plastic, such as polyethylene, and the cover is made of a flexible and deformable material, such as latex.

Other patents disclose enclosed structures and materials commonly used to form same.

U.S. Pat. No. 3,783,089, which issued on Jan. 1, 1974 to A. R. Hurst, et al., is directed to a heat sealed, readily peelable or tearable structure suitable for closures, labels, packaging and the like. The tray of this patent provides a container formed of a high density polyethylene and a peelable sealing sheet that is formed by laminating or otherwise joining a polyamide substrate, namely nylon-6, and a thin film of a low density polyethylene. The laminate is heat sealed on the container and the thermoplastic polymers include polyesters.

U.S. Pat. No. 3,380,578, which issued on Apr. 30, 1968 to G. C. Sparks, is directed to a strip package assembly that includes a body of relatively stiff, thermoplastic material and a cover or strip formed of an aluminum foil with a thermoplastic coating on one face thereof. The thermoplastic body and the thermoplastic coat of the cover mate to form a heat seal therebetween.

French reference No. 2,040,845 to Wagner is directed to an ice cube tray that includes a thermoplastic body that forms a plurality of cavities and an aluminum film cover. The body and cover are fastened together by glue.

French reference No. 2,169,491 to Henry is also directed to an ice cube tray that has a cover and a body that forms a plurality of cavities. The body is made of plastic, such as, polyethylene, and the cover is made of plastic alone or in combination with aluminum and paper. The body and cover are heat sealed together.

All of the above fail to provide the laminated cover of the present ice tray. None of the above patents provide the combination of materials found in the present ice cube tray. Also, none of the above provides for a single sheet of cover having an individual portion or area over each cavity that can be peeled off in order to provide for removal of the ice cube from one cavity while the cover prevents the other ice cubes from ejecting from their cavity.

Further, the present ice cube tray offers a unique cover that is light in weight, yet has sufficient weight to provide stacking of ice cube trays for shipment and storage. Still further, the present ice cube tray provides individual sealing of each cavity that keeps oxygen out of the cavity thereby avoiding or preventing bacteria, which is not found in the above prior art.

In addition, the present ice cube trays provide individually accessible cavities that indicate once the cavity has been disturbed.

SUMMARY OF THE INVENTION

Against the foregoing background, it is a primary object of the present invention to provide an enclosed, non-reusable ice cube tray in which individual ice cubes formed in each cavity can be removed while prohibiting ejection of the ice cubes from the other cavities.

It is another object of the present invention to provide such an ice tray in which the cover is made of light weight material that has sufficient strength to maintain its sealing engagement with the cavity when supporting other trays during storage and shipping.

It is still another object of the present invention to provide such an ice tray in which the cover is laminated into a single sheet of material.

It is yet another object of the present invention to provide such an ice tray in which the cover is a laminate of polyamide and polyester.

It is yet still another object of the present invention to provide such an ice tray that provides an affirmative indication should the seal between the cavity and the cover be broken.

It is a further object of the present invention to provide such an ice tray that forms as tight as possible seal between the cover and each cavity to minimize or prevent oxygen from entering the sealed cavity and thereby avoid bacteria therein.

It is a still further object of the present invention to provide such an ice tray that is relatively inexpensive.

To the accomplishment of the foregoing objects and advantages, the present invention, in brief summary, comprises an ice tray having a body and a cover that includes means for securing together the body and the cover. The body includes a plurality of individual cavities for receiving liquid therein. Each cavity has a lip formed about each upper edge of each cavity. The cover is sized to mate with the body. The cover is sealed along each lip of each cavity to provide a liquid tight seal for each cavity.

The body and cover are each, preferably, formed of a single sheet of material. The body is made of polyvinyl chloride, and the cover is made of a laminate that contains adhesive between the polyester and the polyamide layers, and a plastic coat on the free side of the polyester layer. The plastic, at a desired temperature, affixes the cover to the lip or upper edge about each cavity of the body to form the liquid tight seal for each cavity.

BRIEF DESCRIPTION OF THE DRAWINGS

The foregoing and still the objects and advantages of the present invention will be more apparent from the following detailed explanation of the preferred embodiments of the invention in connection with the accompanying drawings wherein.

DESCRIPTION OF THE PREFERRED EMBODIMENTS

Figure 1:
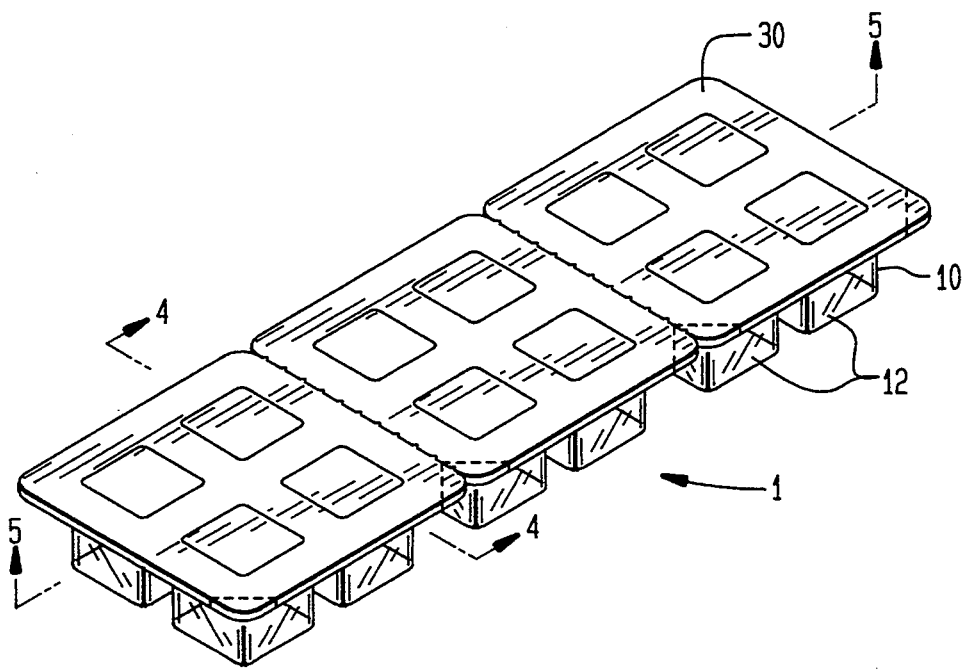
FIG. 1 is a perspective view of the ice tray of the present invention.

Referring to the drawings and, in particular, to FIG. 1, an ice cube tray, generally represented by reference numeral 1, includes a base or body 10 and a cover or lid 30. The body 10, when formed, has a plurality of receptacles or cavities 12 each adapted to receive a liquid, such as water, therein. Each cavity 12 has an upper edge or lip 22, shown more clearly in FIGS. 3 and 4, formed at the upper edge of each wall 18 and, thus, about the entire perimeter of the ice tray 1.

Figure 2:
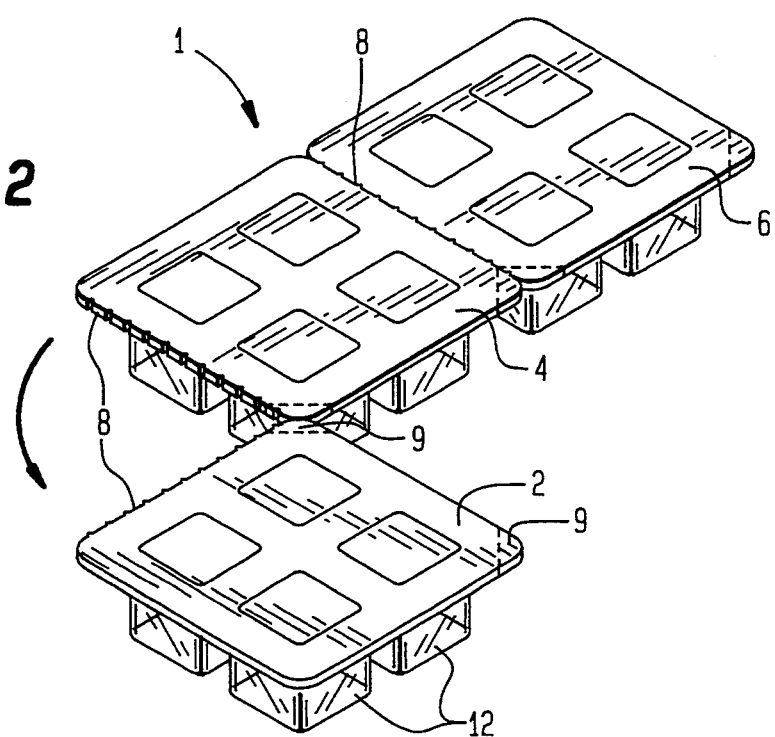
FIG. 2 is a perspective view of the ice tray of FIG. 1 with one section removed.
Figure 3:
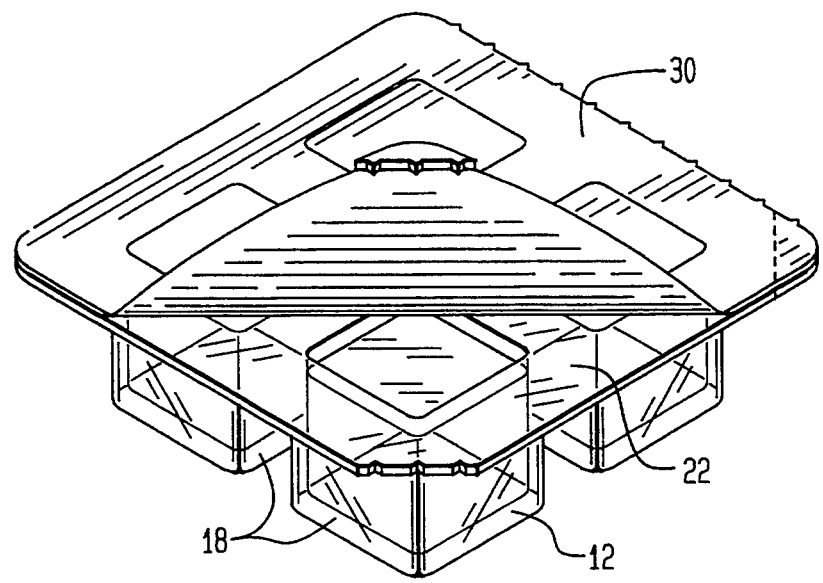
FIG. 3 is a perspective view of a section of the ice tray of FIG. 1 with the cover being removed.

As shown in FIGS. 1 through 3, the cover 30, which is sized complementary to the body 10, is adapted to cover the body so that the ice tray 1 forms a completely closed structure.

In the preferred ice tray 1 shown in FIG. 2, the ice tray 1 includes three sections 2, 4 and 6. In this preferred embodiment, each section 2, 4 and 6 includes four cavities 12 (only three are shown) of the body 10 and the corresponding portion of the cover 30. Each section 2, 4 and 6 is adapted to be separated from the other sections by a perforation line 8 that pierces the lip 22 of the body 10, and the cover 30.

The perforation line 8 is formed by a long knife or other cutting means that under pressure cuts into and through intermittent parts of the cover 30 and the lip 22 of the body 10. The perforation line 8 is strong enough to maintain the sections in place until physically pulled apart by the user. It has been found that a few thousand kilos of pressure is needed to pull apart a single section, such as section 2 shown in FIG. 2, from the remainder of the ice tray 1. The strength needed to make the perforation line 8 between each section is 10,500 Newtons. During production, a total of 84,000 Newtons is used to make the perforation lines for four trays at the same time.

It should be understood that perforation lines 8 could be placed about each cavity 12 so that each individual cavity could be separated from the remainder of the ice tray 1. It should be further understood that each section could be any number of cavities, although an even number is preferred. However, perforation lines 8 would be needed to provide for such desired separation.

Each section 2, 4 and 6, preferably, has at least one perforated corner 9 that perforates both the cover 30 and the lip 22 of the body 10 in order to facilitate removal of the cover from the body. In the most preferred embodiment shown in the drawings, each section 2, 4 and 6 has two perforated corners 9 positioned on the same side of the cavity section.

The body 10 can be formed on conventional thermoforming equipment from a roll of flat stock. The flat stock is passed through the thermoforming equipment to punch out or form the plurality of cavities 12. However, each cavity 12 is formed with a lip 22. The lip 22 of two contiguous cavities 12, preferably, are one and the same lip as clearly shown in FIG. 4. The size of each lip 22 between the walls 18 of two contiguous cavities 12 is about 3.5 millimeters (mm). However, due to the taper of each side wall of each cavity 12, the distance between the bottoms 14 of each cavity is about 10 mm.

Each cavity 12 can be of any size however, in view of the size of normal refrigerator and normal drinking glasses, it is recommended that each cavity 12 be sized to form ice cubes having a mean size of approximately 27 by 27 by 27 mm and with each cube holding about 20 milliliters of liquid, such as water.

The term ice cube as used in this application means the formation of a block of ice into any size and any shape. The ice cube and each cavity of the ice tray can have any shape, such as an oval, circular, square, or rectangular, or it may have a combination of such shapes, or it may also form some surfaces of the ice cube flat while other surfaces have sharp angles or grooves.

Figure 7:
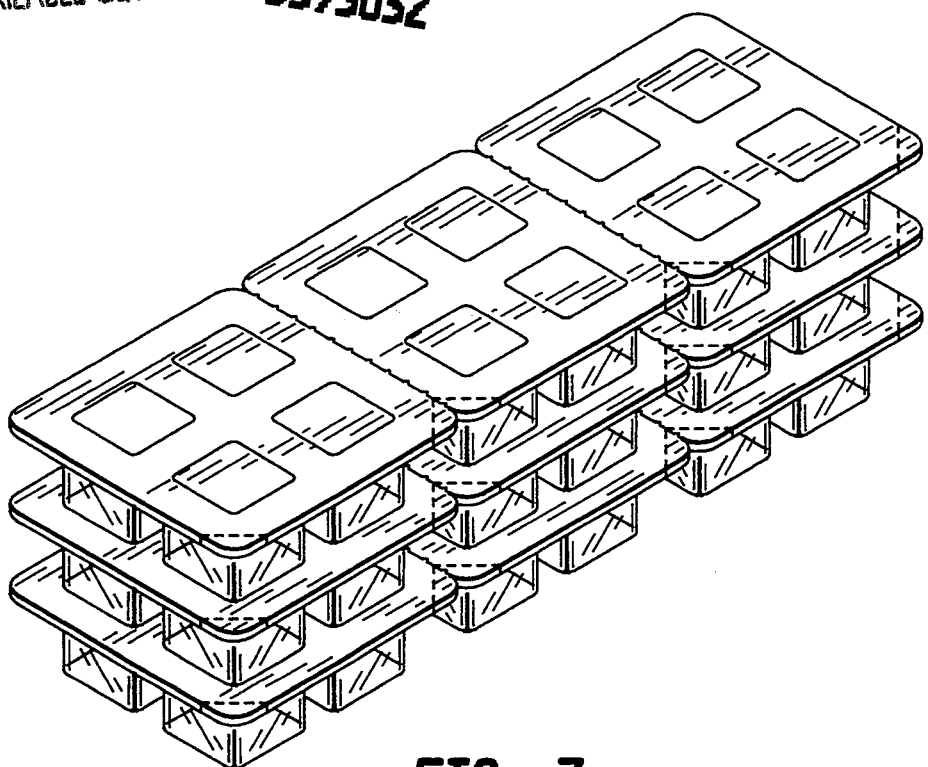
FIG. 7 is a perspective view illustrating the stacking of three ice trays of the present invention shown in FIG. 1.
Figure 4:
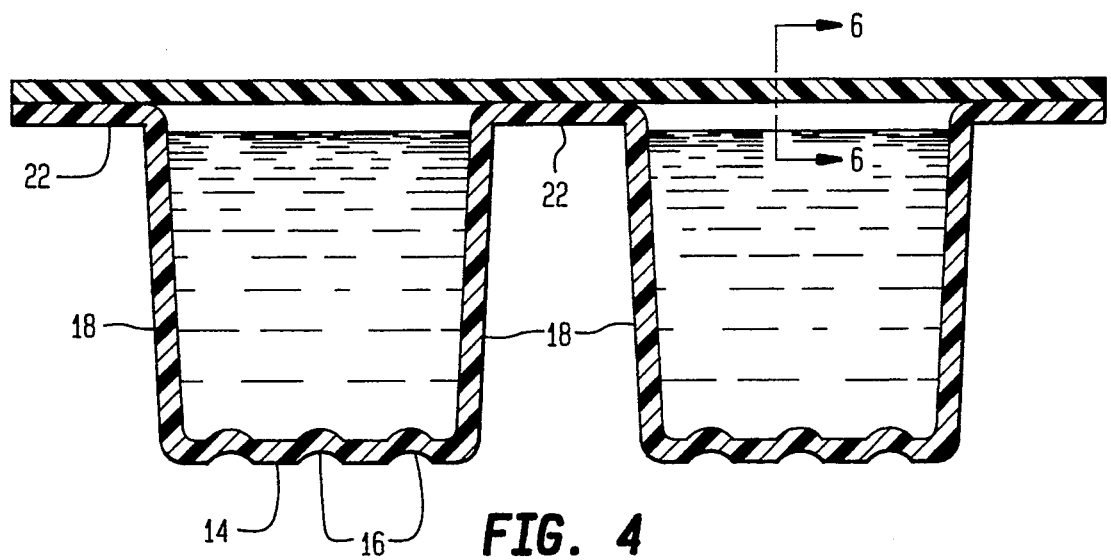
FIG. 4 is a cross-sectional view taken along line 4—4 of FIG. 1.
Figure 5:
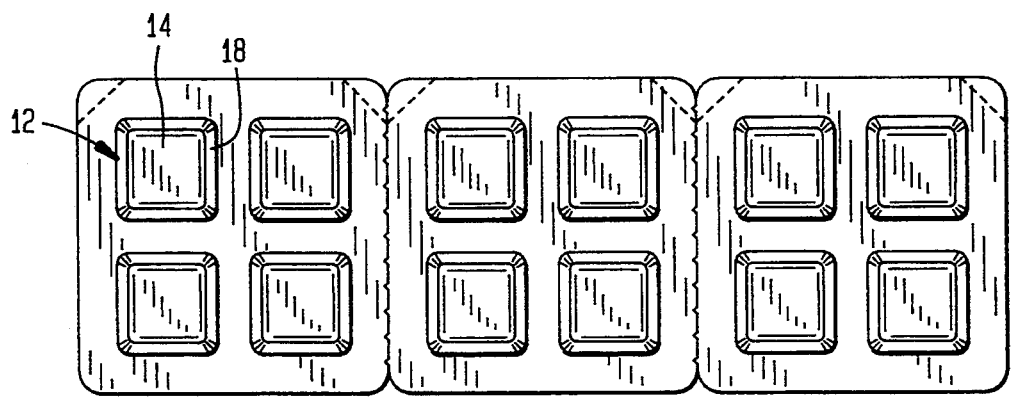
FIG. 5 is a bottom view taken along line 5—5 of FIG. 1.

Referring to FIGS. 3 through 5, it is preferable that the thickness of the bottom 14 and the four walls 18 of each cavity 12 be as thin as possible to minimize the amount of material, and thus the cost and the weight of the ice tray 1, yet permit desired deformation to eject the formed ice cube from the cavity. However, each cavity 12 must be thick enough to cause the ice cube therein to freeze properly, to withstand unintentional piercing, and to maintain its shape or integrity during freezing and thereafter. In addition, each cavity 12 is strong enough to maintain its shape should several other ice trays be stacked thereon, such as, for example, two other ice trays of the present invention as shown in FIG. 7.

As shown in one preferred embodiment illustrated in FIG. 4, the bottom wall 14 of each cavity 12 of the ice tray 1 may include embossments 16 that may form weakened areas to assist in the flexing of the bottom wall and thus ejection of the ice cube.

The thickness of the bottom 14 should, preferably, be less than the thickness of each wall 18 in order to provide for easy ejection of the ice cube formed therein. The thickness of the bottom 14 of the ice tray 1 should be between about 50 micrometers (um) and about 200 micrometers, while the thickness of each wall 18 should be between about 100 micrometers and about 300 micrometers. In a preferred embodiment, the thickness of the bottom is about 100 micrometers and each wall is about 200 micrometers.

To facilitate the release of the formed ice cube from a cavity 12 of the ice tray 1, it is preferred that the walls 18 of the cavity be tapered downward from the top to the bottom 14 of the cavity as shown in FIGS. 4 and 5. The taper assists in permitting the formed ice cube to slide out of the cavity 12. The taper should be as minimal as possible in order to increase the volume of the formed ice cube, however it is believed that the taper needs to be at least one degree.

The body 10 of the ice tray 1 is made of pure polyvinyl chloride (PVC) plastic. This differs from the related priority applications named above in which the more preferred embodiment had a base film made of polyvinyl chloride (PVC) that was first coated polyvinylidene chloride (PVDC) and polyethylene (PE) was then laminated onto the PVDC coating of the PVC.

The pure PVC has been found to be relatively inexpensive and is readily available, yet pure PVC is strong enough so that it will not be unintentionally pierced, thus protecting and insuring the purity of the liquid therein. Pure PVC provides a moisture vapor barrier that basically prevents the water sealed in the cavity 12 from evaporating prior to and during freezing, and can withstand both the high temperature that emanates during the thermoforming process and the sub-freezing temperature needed to form the ice cubes. Further, this material is clear so that the user can readily determine whether the ice cube is fully formed, i.e. fully frozen and, of course, it meets federal government regulations concerning ingestion.

Figure 6:
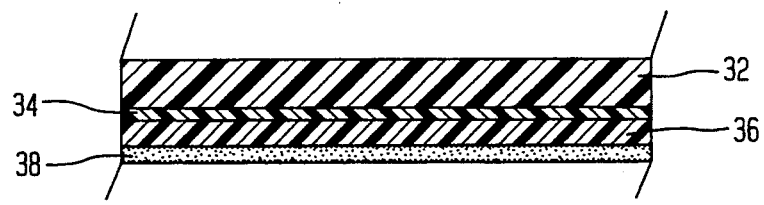
FIG. 6 is an enlarged and more detailed view of a portion of the cover depicted in FIG. 4.

Referring to FIG. 6, the present cover 30 is unlike the aluminum based, PVD-polyvinylidene chloride (PVDC) coated cover of the priority applications. The present cover 30 is a laminate that is formed of polyamide and polyester with an adhesive therebetween. In addition, a plastic peel coat or coat layer is provided on the polyester. In particular, the cover 30 has a layer 32 of 60 parts by weight polyamide and a layer 36 of 25 parts by weight polyester with the plastic peel coat layer 38 on one side thereof. A layer 34 of adhesive is positioned on the polyester layer 36, but on the side without the plastic coat layer 38. Lastly, the polyamide layer 32 is then applied onto the adhesive 34. The polyamide layer 32 is the top of the cover 30, and provides for printing on the cover.

The adhesive 34 binds together, at an appropriate temperature, the polyamide and the polyester layers 32, 36 to form the laminated cover 30. The adhesive 34 is applied onto the polyester layer 36 by a rolling cylinder, and then the polyamide layer 32 is applied onto the adhesive.

The plastic layer 38 is on one side of the polyester layer 36, which side is opposite the polyamide layer 32. In a preferred embodiment, the polyester layer 36 with the plastic peel coat layer 38 are provided together from a supplier. In a most preferred embodiment, the polyester film with plastic coat is Mylar 25 OL polyester film sold by DuPont de Nemours Int. S.A. This polyester film with plastic coat has a yield value 29.2 $m^2$/kg; unit weight 34.2 g/$m^2$; thickness 25 micrometers; stiffness modulus 3790 MPa; tear strength 4.9N; oxygen permeability 75 cc/$m^2$/day/atm; and heat seal 4.4N/15 mm or 173 g/in.

At a desired temperature, the plastic layer 38 affixes the body 10 and the cover 30 together in a liquid tight sealing engagement. The plastic coat side of the cover 30 has a melting point of about 120 degrees Centigrade (C.), whereas the melting point of the other or polyamide side of the cover is about 190 degrees C. The plastic coat side of the cover 30 has a coefficient of friction between about 0.20 and about 0.25, whereas the polyamide side of the cover 30 has a coefficient of friction between about 0.15 and about 0.20.

The adhesive used to laminate together the polyester and polyamide layers is a solvent resin on a polyurethane base with an adhesive component and a hardener component. The preferred adhesive is made by Herberts GmbH of West Germany and is sold under the name Herberts Kaschierharz 2-K-LF 500 A/424. The adhesive is 100 parts adhesive component to 60 parts hardener component. The thickness of the adhesive component at 20 degrees C. is about 1.14, while the thickness of the hardener component at 20 degrees C. is about 1.24. The viscosity of the adhesive component is 450+/−1000 mPas at 25 degrees C., and the viscosity of the hardener component is about 5000+/−1000 mPas at 25 degrees C. The binding strength of each component is 100 percent.

It is believed that any polyamide can be used as the material for the body. However, polyamide 6 and polyamide 6.6 are preferred with the polyamide 6 the most preferred. The reason for the preference is that polyamide 6 is the least expensive polyamide that also has the characteristics needed included, but not limited to, strength, the ability to receive print thereon, the ability to adhere, and the ability to withstand freezing temperatures of the refrigerator. The preferred polyamide 6 is sold by SNIA and BASF companies.

The laminated cover 30 has a thickness between about 15 micrometers and about 100 micrometers. In a preferred embodiment, the thickness of the laminated cover 30 is about 85 micrometers. The cover 30 has a weight per unit area of about 104.6 g/m$^2$.

FIG. 7 illustrates the stacking of three ice trays of the present invention. The intended commercial package shall include three such stacked ice trays.

The laminated cover 30 has characteristics that it can support a number of stacked trays, as many as ten, for periods of time as long as one year. The laminated cover 30 provides enough structural support to permit the stacking of the ice trays during shipment in ships, planes and rail cars, from state to state and country to country. In addition, the ice trays can be stacked for storage for prolonged periods of time, yet the cover 30 is flexible enough so that an ice cube can be peeled-off.

The ice tray 1 is formed and filled as follows. The rolled stock goes through the forming die of a thermoforming machine and forms the body 10 having the plurality of cavities 12. The cavities are then filled with the desired liquid, such as "pure" spring water, and the cover 30 is secured to the body 10 simultaneously with the filling of the cavities by heating the covered body, to further assure that no contaminants enter the cavities.

To secure the cover 30 to the body 10, the cover is heated while the cover and body are being pressed together so that the plastic coat 38 will affix the cover to the body and, in particular, the lips 22 of each cavity 12. The cover 30 and body 10 are pressed together as tightly as possible to keep oxygen from the inside of the enclosed ice tray 1. This feature minimizes or avoids bacteria in the ice tray 1.

Along these same lines, the present invention provides that the edge of each cover area is entirely sealed to all lips 22 of each cavity 12. As shown in FIG. 3, when the cover area over one cavity 12 is peeled off, the remainder of the cover remains over parts of the other cavities thereby preventing the other formed ice cubes from releasing from the ice tray 1. Significantly, once the first ice cube is ejected, the cover 30 will not tack back onto the lip 22 of the ejected ice cube cavity. The reason for this is that a new heat seal would be needed to tack the cover 30 back onto the lips 22 of the cavity 12.

The laminated cover 30 is strong enough to withstand stacking of other ice trays, yet it is flexible and elastic enough so that when it is removed from the lip of a cavity, the laminated cover starts to roll onto itself to form a coil as partially shown in FIG. 3. This feature is significant since it prevents ejection of the ice cubes from adjacent cavities. Specifically, when the cover 30 is removed from over a single cavity 12, it rolls back onto itself and a portion of the formed ice cube of the adjacent cavities are exposed, yet the formed ice cubes cannot eject from their cavities until virtually the entire cover area of that cavity is removed. Thus, the ice cubes can not be ejected from the adjacent cavities until the cover 30 is intentionally removed therefrom so that the coiling of the cover 30 of the present invention prevents unintentional ejection of the ice cubes from the ice tray.

The overall size and shape of the cover 30 is preferably established to mate with the overall size and shape of the body 10. It is preferred that the cover 30 be sized and shaped exactly complementary to the perimeter edges of the body 10 to minimize the amount of material and the overall size of the ice tray 1.

It is preferable that as much liquid as possible be included in each separate enclosed cavity, however some space must be left to provide for expansion of the water that occurs during the freezing process. It has been found that in the preferred cavity, i.e. the cavity having 27 by 27 by 27 mm dimensions, the expansion is approximately 6% so that approximately 6% of the cavity must not be filled with liquid.

Thus, the ice tray 1 insures that only a desired liquid, such as "pure" spring water, is used to form the resultant ice cubes by the features that the cavities are filled by the manufacturer and one can not gain access to the cavity without permanently removing the cover area over the cavity. If a customer or user notes that a cover area is not sealed to the cavity, the customer has a positive or visual indication that the contents of the cavity has been exposed and, thus, may be contaminated.

Having thus described the invention with particular reference to the preferred forms thereof, it will be obvious that various changes and modifications may be made therein while retaining the advantages and benefits of the present invention and without departing from the spirit of the invention as defined by the appended claims.

Wherefore, I claim:

1. An ice cube tray for containing a liquid that forms into a plurality of ice cubes, said tray comprising:

a body having a plurality of cavities each for receiving a portion of the liquid, each of said plurality of cavities having a bottom and a plurality of side walls with each side wall having an upper lip, said body being formed of pure polyvinyl chloride plastic;

a cover being adapted to be secured to said body and having a plurality of cover areas, said cover being formed of a laminate of a polyester layer, an adhesive on said polyester layer, a polyamide layer on said adhesive, and a plastic coat on a side of said polyester layer opposite said adhesive, wherein said plastic coat affixes said cover to each lip of each cavity when heated to a sufficient melting point; and wherein each cavity forms a liquid tight seal that prevents oxygen from entering into an enclosed cavity, and wherein once a formed ice cube is removed from a cavity said cover portion of that cavity can not be reattached to that cavity.

2. The ice tray according to claim 1, wherein the sufficient melting point is 120 degrees C.

3. The ice tray according to claim 1, wherein said liquid tight seal prevents bacteria from entering into said enclosed cavity.

4. The ice tray according to claim 1, wherein said cover has sufficient strength to support at least two other stacked ice trays.

5. The ice tray according to claim 1, wherein upon removal from over a first cavity, said laminated cover being effective to roll onto itself and prevents ejection of ice cubes from adjacent cavities.

* * * * *